US012554680B1

(12) United States Patent
Hasegawa et al.

(10) Patent No.: US 12,554,680 B1
(45) Date of Patent: Feb. 17, 2026

(54) TAPE MOUNTING WITH TAG FILTERING

(71) Applicant: INTERNATIONAL BUSINESS MACHINES CORPORATION, Armonk, NY (US)

(72) Inventors: Tohru Hasegawa, Tokyo (JP); Sayaka Tamai, Tokyo (JP); Keisuke Nitta, Koshigaya (JP); Yasumasa Kajinaga, Funabashi (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 18/908,044

(22) Filed: Oct. 7, 2024

(51) Int. Cl.
*G06F 16/14* (2019.01)
*G06F 16/16* (2019.01)
*G06F 16/172* (2019.01)
*G06F 16/25* (2019.01)
*G06F 16/901* (2019.01)

(52) U.S. Cl.
CPC ............ *G06F 16/148* (2019.01); *G06F 16/14* (2019.01); *G06F 16/164* (2019.01); *G06F 16/172* (2019.01); *G06F 16/258* (2019.01); *G06F 16/901* (2019.01)

(58) Field of Classification Search
CPC ........ G06F 16/148; G06F 16/14; G06F 16/22; G06F 16/172; G06F 16/174; G06F 16/258; G06F 16/901; G06G 16/164
USPC ......................................................... 707/822
See application file for complete search history.

(56) References Cited

U.S. PATENT DOCUMENTS

| 5,764,972 | A | 6/1998 | Crouse | |
|---|---|---|---|---|
| 6,278,992 | B1* | 8/2001 | Curtis | G06F 16/2237 707/711 |
| 7,155,465 | B2 | 12/2006 | Lee | |
| 7,178,100 | B2* | 2/2007 | Call | G06F 40/221 715/210 |
| 9,021,175 | B2 | 4/2015 | Butt | |
| 11,010,104 | B2 | 5/2021 | Hasegawa | |
| 2017/0344570 | A1 | 11/2017 | Abe | |
| 2020/0242077 | A1* | 7/2020 | Dain | G06F 16/24573 |
| 2020/0242079 | A1* | 7/2020 | Dain | G06F 16/164 |
| 2022/0156309 | A1* | 5/2022 | Asbjornsen | G06F 16/45 |
| 2023/0237016 | A1 | 7/2023 | Naujok | |

OTHER PUBLICATIONS

"IBM Spectrum Archive EE data structure on LTFS media," IBM Corporation, May 28, 2021, 4 pp.

(Continued)

*Primary Examiner* — Shahid A Alam
(74) *Attorney, Agent, or Firm* — Konrad, Raynes, Davda & Victor LLP; David Victor

(57) ABSTRACT

Provided are a computer program product, system, and method for tape mounting with tag filtering. A determination is made of metadata tags for files to write to a storage device. A tag list is updated with the metadata tags for the files. A determination is made of bit representations for the files. A bit representation for a file identifies metadata tags for the file in the tag list. The bit representations to the files are converted to numerical values in a first numbering system different from a second numbering system used for the bit representations. The files are written to the storage device. The tag list and the numerical values for the files are written to an index for the files in the storage device.

20 Claims, 6 Drawing Sheets

(56) References Cited

OTHER PUBLICATIONS

"IBM Spectrum Archive Single Drive Edition (SDE) 2.4.5," IBM Corporation, 2023, 1071 pp.
"Linear Tape File System (LTFS) Format Specification," SNIA, Aug. 28, 2020, 104 pp.
"Log archiving using db2tapmgr," IBM Corporation, Jan. 12, 2024, 4 pp.
"Metadata Storage," IBM Corporation, Apr. 19, 2021, 1 pp.
"Tape Indexing Methodology for Long Term Archives," IP.com, IP.com No. IPCOM0000174460D, Sep. 9, 2008, 9 pp.

* cited by examiner

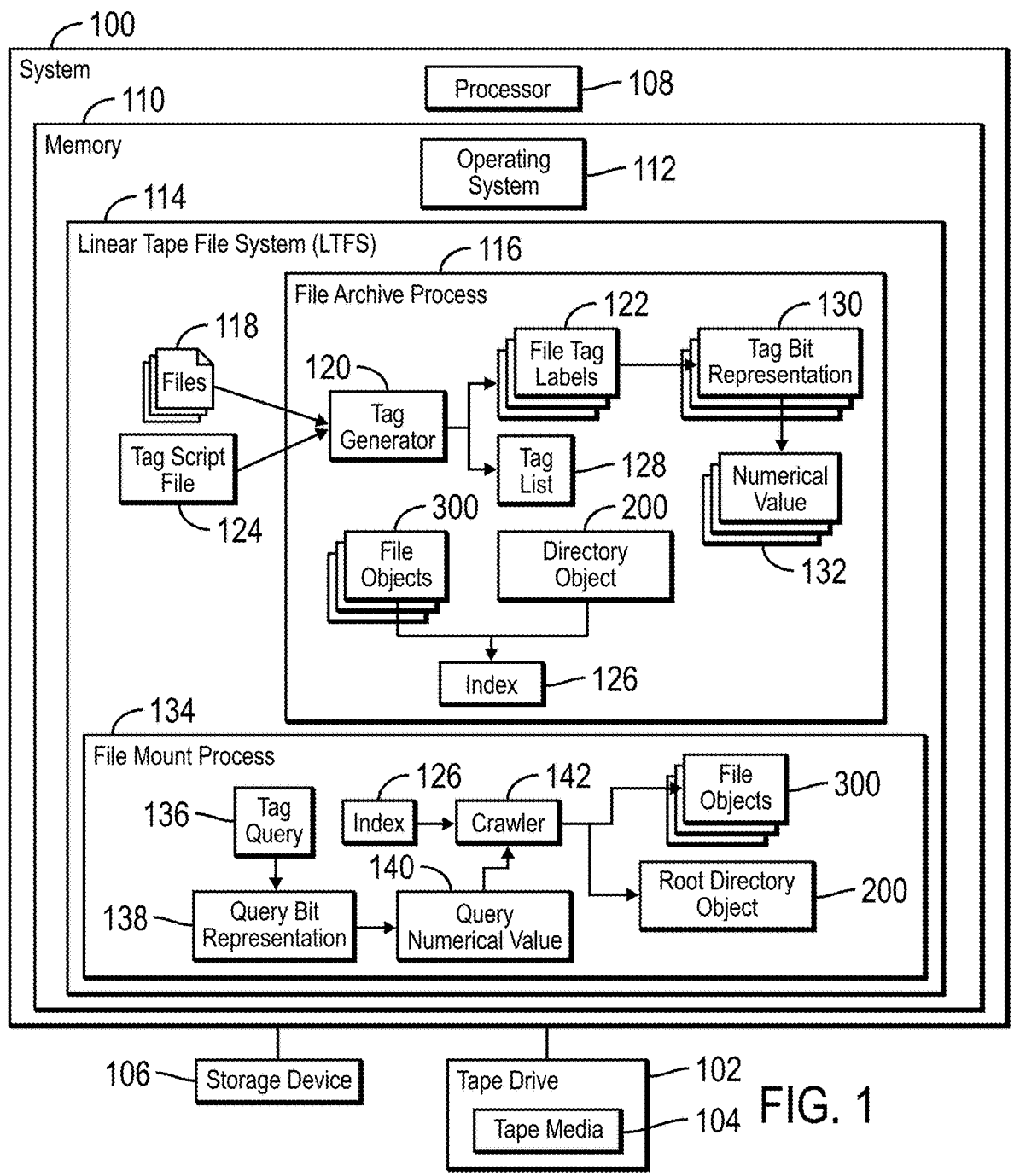
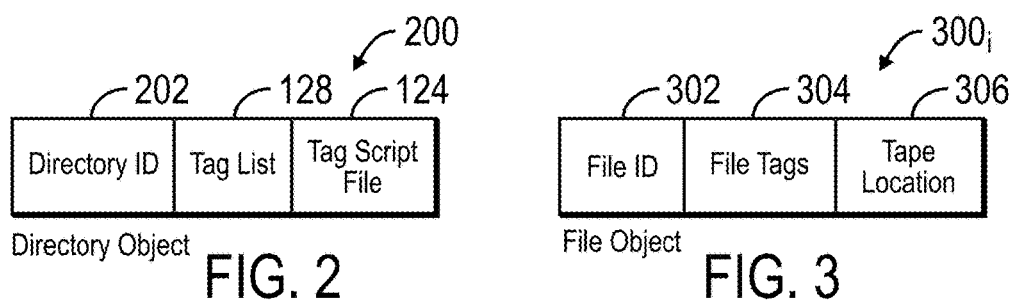
FIG. 1
FIG. 2
FIG. 3

```
Index
...
<directory>
<fileuid>1</fileuid>
<name>LTFS Volume Name</name>
<readonly>false</readonly>
<creationtime>2013-02-16T19:13:42.986549106Z</creationtime>
<changetime>2013-02-16T19:13:47.517309274Z</changetime>
<modifytime>2013-02-16T19:13:47.517309274Z</modifytime>
<accesstime>2013-02-16T19:13:42.986549106Z</accesstime>
<backuptime>2013-02-16T19:13:42.986549106Z</backuptime>
<extendedattributes>
<xattr>
<key>ltfs.vendor.taglist</key>
<value>"CompanyA","keyword1","keyword2","CampanyB","keyword3"</value>
</xattr>
</extendedattributes>
<contents>
<directory>
<fileuid>2</fileuid>
<name>directory1</name>
....
<file>
<fileuid>8</fileuid>
<name>read_only_file</name>
<length>0</length>
<readonly>true</readonly>
<creationtime>2013-02-16T19:13:47.517309274Z</creationtime>
<changetime>2013-02-16T19:13:47.519534438Z</changetime>
<modifytime>2013-02-16T19:13:47.000000000Z</modifytime>
<accesstime>2013-02-16T19:13:47.000000000Z</accesstime>
<backuptime>2013-02-16T19:13:47.517309274Z</backuptime>
<extendedattributes>
<xattr>
<key>author_name</key>
<value>Jane Smith</value>
</xattr>
<xattr>
<key>ltfs.vendor.tag</key>
<value>50</value>
</xattr>
</extendedattributes>
</file>
...
```

FIG. 4

TAPE MOUNTING WITH TAG FILTERING

BACKGROUND OF THE INVENTION

The present invention relates to a computer program product, system, and method for tape mounting with tag filtering.

Linear Tape File System (LTFS) comprises a software program that allows a user to access files in a tape media through a file system type interface. LTFS is run as a process in a system with an operating system. The tape media stores an index in the Extended Markup Language (XML) format that provides information for all files and directories written to the tape. When LTFS mounts a tape, the LTFS reads the index from tape and creates objects, or "dentries", in the memory of the computer system for each file and directory. The created "dentries" are stored in memory of the LTFS process. When the files are enumerated through the dentries, the LTFS provides information on the files using the "dentries" in memory.

SUMMARY

Provided are a computer program product, system, and method for tape mounting with tag filtering. A determination is made of metadata tags for files to write to a storage device. A tag list is updated with the metadata tags for the files. A determination is made of bit representations for the files. A bit representation for a file identifies metadata tags for the file in the tag list. The bit representations to the files are converted to numerical values in a first numbering system different from a second numbering system used for the bit representations. The files are written to the storage device. The tag list and the numerical values for the files are written to an index for the files in the storage device.

BRIEF DESCRIPTION OF THE DRAWINGS

FIG. 1 illustrates an embodiment of a system coupled to a tape drive.

FIG. 2 illustrates an embodiment of information in a directory object.

FIG. 3 illustrates an embodiment of a file object.

FIG. 4 illustrates an embodiment of an index implemented in XML.

DETAILED DESCRIPTION

Figure 5:
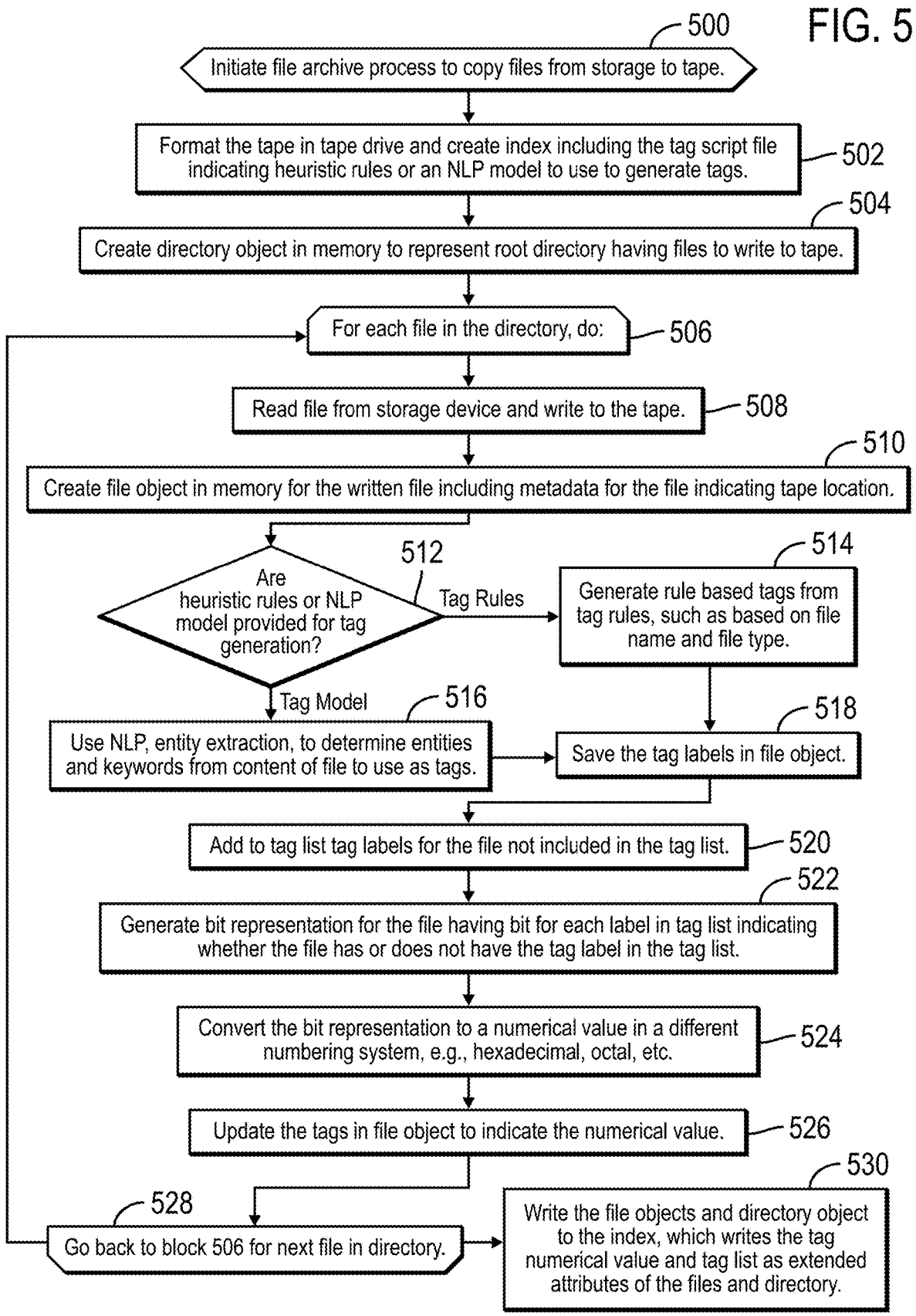
FIG. 5 illustrates an embodiment of a file archive process to copy files in a storage device to a tape media in a tape drive.

As the capacity of data stored in tape media increases due to technological advances, the number of files and directories stored in tape also substantially increases. This increase in the number of files increases the time for the system operating system to enumerate the files stored in tape. In order to enumerate the files in a directory stored in tape, Application Program Interfaces (APIs), such as FindFirstFile( )/FindNextFile( ), are called repeatedly from the system operating system. Each API call causes a context switch from user mode to kernel mode. Therefore, as the number of files increases, the number of context switches also increases, causing a decrease in response time and a substantial increase in the time to enumerate all the files.

Described embodiments provide improvements to computer technology to substantially reduce the time to enumerate files in tape media by providing metadata tags associated with the files. These metadata tags are stored in the index for the files in tape that is stored in tape. Described embodiments provide a technique to store a numerical value representing the metadata tags for each file that can be used to determine the metadata tags for the file from a tag list stored in the index for the root directory. The numerical value comprises a compressed representation of the tags for a file that reduces the system memory required to represent the file tags and that reduces space consumed in tape to represent the file tags. When the tape media is mounted in a tape drive, described embodiments allow the user to specify a tag query of one or more tags to filter the files on tape enumerated in system memory so that only files having metadata tags including one or more tags of the query are enumerated. In this way, the number of files enumerated in system memory are substantially reduced to only those satisfying the user tag query, which reduces the number of context switches from user mode to kernel mode to create an object for each file to enumerate in system memory.

FIG. 1 illustrates an embodiment of a system 100 coupled to a tape drive 102 including a tape media 104, such as a Linear Tape Open (LTO) tape cartridge, and a storage device 106, such as hard disk drive, solid state drive etc. The system 100 includes a processor 108, a memory 110, an operating system 112, and a Linear Tape File System (LTFS) 114 program. The LTFS program 114 enables access to the data stored in tape 104 in the tape drive 102 through a file system interface. The LTFS program 114 includes a file archive process 116 to transfer files 118 in the storage device 106 to a tape media 104 in the tape drive 102. The file archive process 116 includes a tag generator 120 to process the files 118 to generate file tag labels 122, comprising metadata having information on the files 118. The tag generator 120 may process a tag script file 124 that indicates a method to use to generate the file tag labels 122 for the files 118. The method may include heuristic rules of regular expressions to generate metadata labels based on certain information on the files 118. The file information may be, for example, the file name, the file type, and similar file data. In some embodiments, a natural language processing (NLP) program may process the content of the files 118 and extract keywords for the file tag labels 122. The tag script file 124 may be maintained in an index 126 stored in the tape media 104. Any file tag labels 122 generated for the files are also added to a tag list 128 providing a complete list of all tags (e.g., metadata labels) generated for files 118 in a directory or other logical entity. The tag list 128 may comprise the tag strings separated by commas.

The file archive process 116 may further generate for each file 118 a tag bit representation 130 that includes a bit for each label in the tag list 128. The tag list 128 indicates whether the file tag labels 122 for a file 118 include the label or do not include the label in the tag list 128. For example, as shown with respect to FIG. 2, if the tag list 128 includes the labels of "CompanyA," "keyword1," "keyword2," "CompanyB," and "keyword3" and a file 118 had file tag labels 122 of "CompanyB" and "keyword1", then the bit representation 130 for that file would comprise "01010", where a "zero" indicates the file tag labels 122 for the file 118 do not include the corresponding label in the tag list 128 and a "one" indicates the file tag labels 122 for the file do include the corresponding label in the tag list 128. The file archive process 116 may further convert the tag bit representation 130 to a numerical value 132 in a number system that is more compact than the binary values implementing the bit representation 130. Number systems more compact than binary may include hexadecimal, octal, decimal, binary coded decimal numbering, real numbering, and decimal numbering, or other types of numbering system that can provide a compact representation of the bit representation 130. In this way, the numerical value 132 comprises a compressed representation of the binary representation 130 of the tags in the tag list 128 assigned to a file.

The file archive process 116 creates a directory object 200 for a root directory and a directory object 200 for each directory in which the files 118 are included. The directory object 200 created for a directory (root or otherwise) includes: a directory ID 202, the generated tag list 128, and the script file 124. The script file 124 indicates the method used by the tag generator 120 to generate tags for files 118 in the directory (e.g., heuristic rules or a natural language processor (NLP)) to perform entity extraction. In this way, different directories may use the same or a different technique to generate tags, such as heuristic rules or an NLP. For each file 118; within the files 118, where 118; denotes a particular file of the files 118, the file archive process 116 creates a file object 300; that includes file identifier (ID) 302, such as unique ID of the file 118; information on the tags 304 for the file 302, which may comprise the file tag labels 122, tag bit representation 130, or numerical value 132; and a tape location 306 on the tape media 104 where the file is stored. The file archive process 116 may store the file objects 300 and the root directory object 200 in the index 126 to store in the tape media 104.

The index 126 may include file objects 300 of metadata for multiple directories as well as the root directory. In certain embodiments, the file archive process 116 may be implemented in the "ltfscp" copy tool command in the LTFS program to copy files from storage 106 to a tape media 104.

The file mount process 134 is a process that is part of the LTFS program 114 to mount a tape media 104, such as an LTO tape cartridge, in the tape drive 102 and make files therein accessible to the user of the system 100. The file mount process 134 receives a mount request which may include a tag query 136 of tag labels to use to filter the files from the tape media 104 that are enumerated in the memory 110. The file mount process 134 may convert the tag query 136 of one or more tag labels to a query bit representation 138. The query bit representation 138 includes a binary value for each corresponding label in the tag list 128 that indicates which tag labels are included and not included in the tag query 136. The query bit representation 138 may be converted to a query numerical value 140 in the same numbering system of the file tag numerical values 132. The crawler 142 may read the index 126 and query numerical value 140 from the tape media 104. The crawler 142 may read the directory and file metadata from the index 126. The crawler 142 may determine files having tag labels 122 that satisfy the tag query 136. The crawler 142 generates in memory 110 directory objects 200 and file objects 300 for files determined to have tag labels 122 matching or satisfying the requirements of the tag query 136 provided with the mount request. A tag label 122 may be determined to satisfy the tag query 136 when the bit representations of both have a "1" or "on" value in the same position indicating they share the label in the tag list 128 corresponding to that "on" bit position in the bit representations.

FIG. 1 includes program code loaded into a memory 110 and executed by one or more processors 108. The program code includes an operating system 112, LTFS 114, file archive process 116, tag generator 120, file mount process 134, tag query 136 that may. Alternatively, some or all of the functions may be implemented as microcode or firmware in hardware devices. An example of firmware in hardware devices that may be used in accordance with embodiments of the present disclosure is an Application-Specific Integrated Circuit (ASIC).

The arrows shown in FIG. 1 illustrate a flow of information and command execution.

The memory 110 may comprise suitable volatile or non-volatile memory devices known in the art. For instance, The memory 110 may comprise one or more memory devices volatile or non-volatile, such as a Dynamic Random Access Memory (DRAM), a phase change memory (PCM), Magnetoresistive random-access memory (MRAM), Spin Transfer Torque (STT)-MRAM, SRAM storage devices, DRAM, a ferroelectric random-access memory (Efram), nanowire-based non-volatile memory, and Direct In-line Memory Modules (DIMMs), non-volatile NAND flash memory, Solid State Drive (SSD), non-volatile RAM, etc.

The storage device 106 may comprise a suitable non-volatile storage device known in the art, such as a hard disk drive, SSD, battery backed up RAM, etc.

In certain embodiments, the tag generator 120 may invoke an NLP or inference engine to extract entities and keywords from the files 118 to use as the file tag labels 122. The tag generator 120 may send the files 118 or certain portions of the files to an inference engine in an artificial intelligence accelerator in the system 100. Alternatively, the tag generator 120 may invoke an inference engine in a remote system to generate the file tag labels 122 for the files 118. If the script file 124 provides heuristic rules, then the tag generator 120 may run the regular expressions of heuristic rules in the tag script files 124 to generate the file tag labels 122.

FIG. 4 illustrates an example 400 of the index 126 in extended markup language (XML) form. The index 400 includes one or more directory sections 402 each having metadata on directories in the tape media 104, including the tag list key 404 and the labels 406 for the tag list key 404. The index 400 further includes file metadata section 408 for each file in the tape media 104, including a tag key 410 and the numerical value 412 calculated for the file tags 122. In this way, instead of storing the bit representation 130 for the file tags 122, a numerical value 412 is stored. This mechanism may require substantially less space to store than the bit representation 130. For example, the bit representation 130 for the file tags 122 may include a very long binary string for a very long tag list 128. In contrast, a numerical value 412, such as a hexadecimal value, may have a substantially shorter string to store the same information. As a result, using a numerical value may require substantially less space to store the data than the bit representation 130. Further, in the embodiment of FIG. 4, the tag list key 404, the values 406, the file tag key 410, and the numerical value 412 may be stored as extended attributes in the index 400. The numerical value 412 may represent the bit representation of the tags for the file.

FIG. 5 illustrates an embodiment of operations performed by the file archive process 116 to copy files in the storage device 106 to the tape media 104. The file archive process 116 initiates (at block 500) the file archive process to copy files from storage to tape. The file archive process 116 formats (at block 502) the tape 104 in the tape drive 102 and creates an index 126 including the tag script file 124. The tag script file 124 indicates whether to generate tags with heuristic rules or using an NLP model. At this point, the index 126 does not have any file/directory metadata because the tape was just formatted. The file archive process 116 creates (at block 504) a directory object 200 in the memory 110 for the root directory in the storage device 106 including the files 118 to write to the tape media 104. For each file in the directory to write to the tape media 104, a loop of operations is performed at blocks 506 to 528. The file is read from the storage device 106 and written (at block 508) to the tape media 104. A file object is created (at block 510) in the memory 110 for each file written to the tape media. The file object may include the metadata for the file indicating the tape location 306 to which the file is written in the tape media 104.

If (at block 512) the script file 124 indicates heuristic rules, then the tag generator 120 applies the tag rules in the script file 124 to generate the tags; the tags may be based on the file name and file type. If (at block 512) the script file 124 identifies an NLP model, the tag generator 120 invokes (at block 516) the NLP model to perform entity extraction to determine entities and keywords from the content of the file to use as the file tag labels 122. The NLP model may be invoked by calling an external inference engine or by calling an inference engine located within the system 100 such as in an AI accelerator. The generated tag labels 122, from either block 514 or 516, are saved (at block 518) in the file tags 304 in the file object for the read file. The file archive process 116 adds (at block 520) tag labels 122 generated for the file to the tag list 128 that are not already included in the tag list 128. As a result, the tag list 128 has a list of all labels generated for all files 118 in the directory being written.

The file archive process 116 generates (at block 522) a bit representation 130 for the file having a bit for each label in the tag list 128 indicating whether the file has or does not have the tag label in the tag list 128. The bit representation 130 may be stored in the file tags field 304 of the file object. The file archive process 116 converts (at block 524) the bit representation 130 to a numerical value 132 in a different numbering system than the binary values of the bit representation 130. The file tags 304 in the file object are updated (at block 526) to include the numerical value 132. The numerical value 132 may replace the previously stored labels 122 or bit representation 130. If there are further files 118 in the directory to process, then the file archive process 116 proceeds back to block 506 to generate a file object 300; for a next file 118 in the directory. If (at block 528) all files 118 in the directory have been processed, then the file objects 300 and directory object 200 are written (at block 530) to the index 126. In the embodiment shown in FIG. 4, the tag list 128 and the tag numerical value 132 are written as the values 406 and numerical value 412, respectively, in the file 402 and directory 408 sections of the index 400.

With the embodiment of FIG. 5, metadata tags are generated for files to write to the tape media 104 within the LTFS program 114. The file tag labels 122 determined for a file may first be expressed as a tag bit representation 130 having a bit for each label in the tag list 128. Because the tag bit representation 130 can be quite long if there are numerous labels in the tag list 128, the described embodiments convert the binary bit representation 130 into a numerical value in another numbering system that may be expressed in a substantially fewer number of bits. In this way, the conversion to the numerical value 132 in the different numbering system compresses the tag bit representation 130 from strings of a large number of binary values to a single numerical value. As a result, the conversion substantially conserves memory 110 and storage space in the tape media 104.

Figure 6:
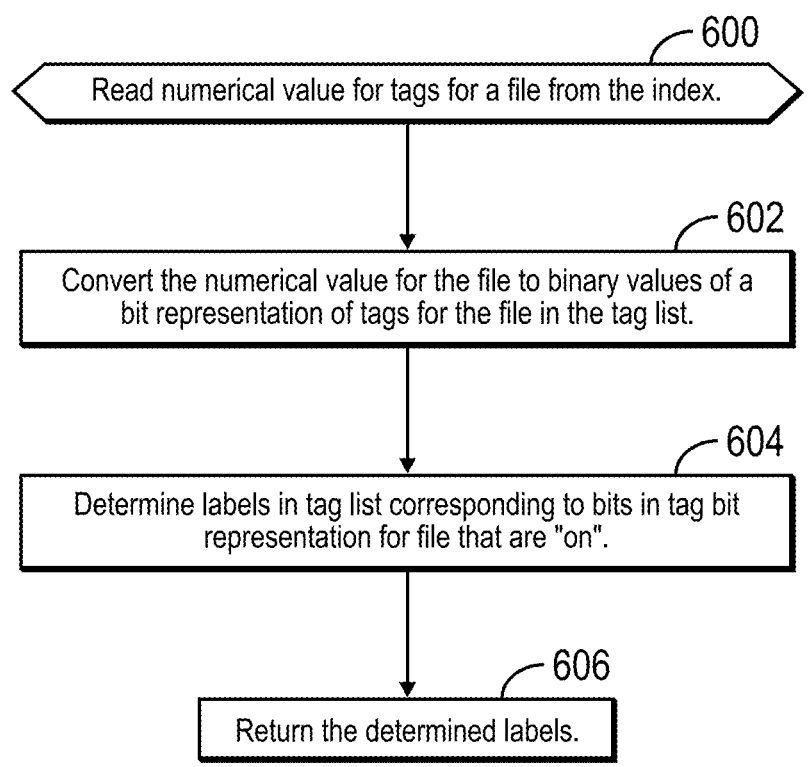
FIG. 6 illustrates and embodiment of operations to determine tag labels for a file stored in the tape media.

FIG. 6 illustrates an embodiment of operations performed by the LTFS program 114 to determine the tag labels 122 for a file to return to an application request. Upon reading (at block 600) the numerical value 132 for the tags from the index 126, the LTFS program 114 converts (at block 602) the numerical value for the file to binary values in a bit representation 130 of tags for the file 118 in the tag list 128. In some embodiments, the numerical value 412 may be read from the file section 408 for a file in the index 400. A determination is made (at block 604) of the labels in the tag list 128 corresponding to bits in the tag bit representation 130 for the file 118 that are "on", which may be represented by a binary value of "1". Alternatively, active tags for a file in the tag list 128 may be presented by a "0". Bits in the tag bit representation 130 for the file that are "off", which may be represented by a value of "0", indicate that the corresponding label in the tag list 128 is not included in file tag labels 122 for the file. The determined labels are returned (at block 606) to the application requesting the labels for the file.

Figure 7:
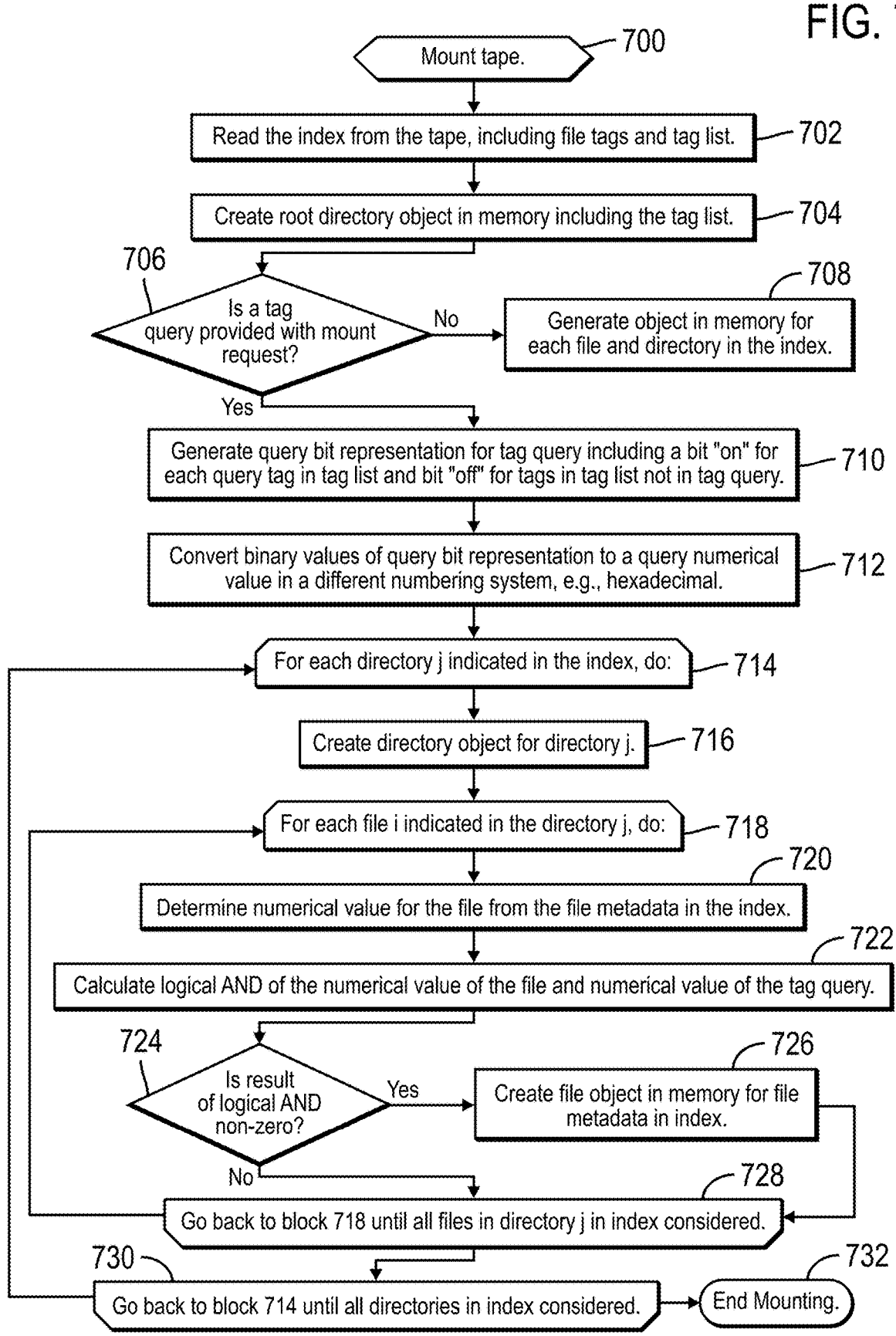
FIG. 7 illustrates an embodiment of operations to mount a tape with a tag query for filtering.

FIG. 7 illustrates an embodiment of operations performed by the file mount process 134 of the LTFS program 114 to mount a tape and enumerate directory 200 and file objects 300 in memory 110 for directories and files indicated in the index 126 in the tape media 104. Upon mounting (at block 700) the tape media 104 in the tape drive 102, the file mount process 134 reads (at block 702) the index 126 from the tape media 104, including file tags 122 and the tag list 128. A directory object 200 is created (at block 704) in the memory 110 for the root directory and includes the tag list 128. If (at block 706) a tag query 136 is not provided with the mount request, then a directory object 200 and file object are generated for each directory and file indicated in the index 126. If (at block 706) a tag query is provided with the mount request, then the file mount process 134 generates (at block 710) a bit representation 138 of the tag query 136. The bit representation 138 includes a bit "on" for each tag in the tag list 128 included in the tag query 136 and a bit "off" for each tag in the tag list 128 not in the tag query 136. The binary values of the query bit representation 138 are converted (at block 712) to a query numerical value 140 in a different numbering system.

From blocks 714 to 730 a loop of operations is performed to create directory objects 200 and file objects for all directories and files in the index 126. A directory object is created (at block 716) for a directory located in the index 126. A loop of operations from blocks 718 to 728 is then performed to create file objects for each file in the directory having file tags in the index 126 including at least one of the tags in the tag query 136. The file mount process 134 determines (at block 720) a numerical value from the file from the file metadata in the index 126 (e.g., numerical value 412 in index 400 as shown in FIG. 4). A logical AND of the numerical value of the file and the query numerical value 140 is calculated (at block 722).

In order to calculate a bitwise logical AND, the query numerical value 140 and the file numerical value 132 may be converted to binary strings to subject to a bitwise logical AND. A logical AND result that has all zeroes indicates there are no tags for the file that match the tags in the tag query 136. In contrast, a logical AND having at least one "on" value of "1" indicates there is at least one tag in the tag query 136 that matches a tag for the file. If one numerical value of the file numerical value 132 and query numerical value 140 has a fewer number of bits than the other, then the numerical value with the fewer number of bits may be padded with zeroes so the numerical values are expressed with the same number of values to allow the logical AND operation to proceed.

If (at block 724) the result of the logical AND is non-zero, then a file object is created (at block 726) in the memory 110 for the file. After creating the file object (at block 722) or if the result of the logical AND has all zero binary values, then control proceeds to block 728 to go back to block 718 if there are still files in the index 126 to process. After all files in a directory are processed, control proceeds (at block 730) back to block 714 if there are further directories in the index 126 to process. After all files and directories in the index 126 are processed, the mounting ends (at block 732).

With the embodiment of FIG. 7, a user may specify a tag query 136 to use to filter the number of file objects 300. For example, in LTFS, the tag query 136 may be used to filter the number of "dentries" (e.g., file objects) created for files in the tape media 104 when the tape media 104 is mounted. The file mount process 134 only creates "dentries" for those files having tags that satisfy the requirements specified by a user in the tag query 136. In this way, the file mount process 134 only creates file objects for those files with which the user is interested to conserve memory 110 by only generating file objects for files satisfying the tag query 136. The reduction in the number of file objects, by using the tag query 136 to filter files, can be substantial as the number of files stored on tape increases.

The present invention may be a system, a method, and/or a computer program product. The computer program product may include a computer-readable storage medium (or media) having computer-readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 8:
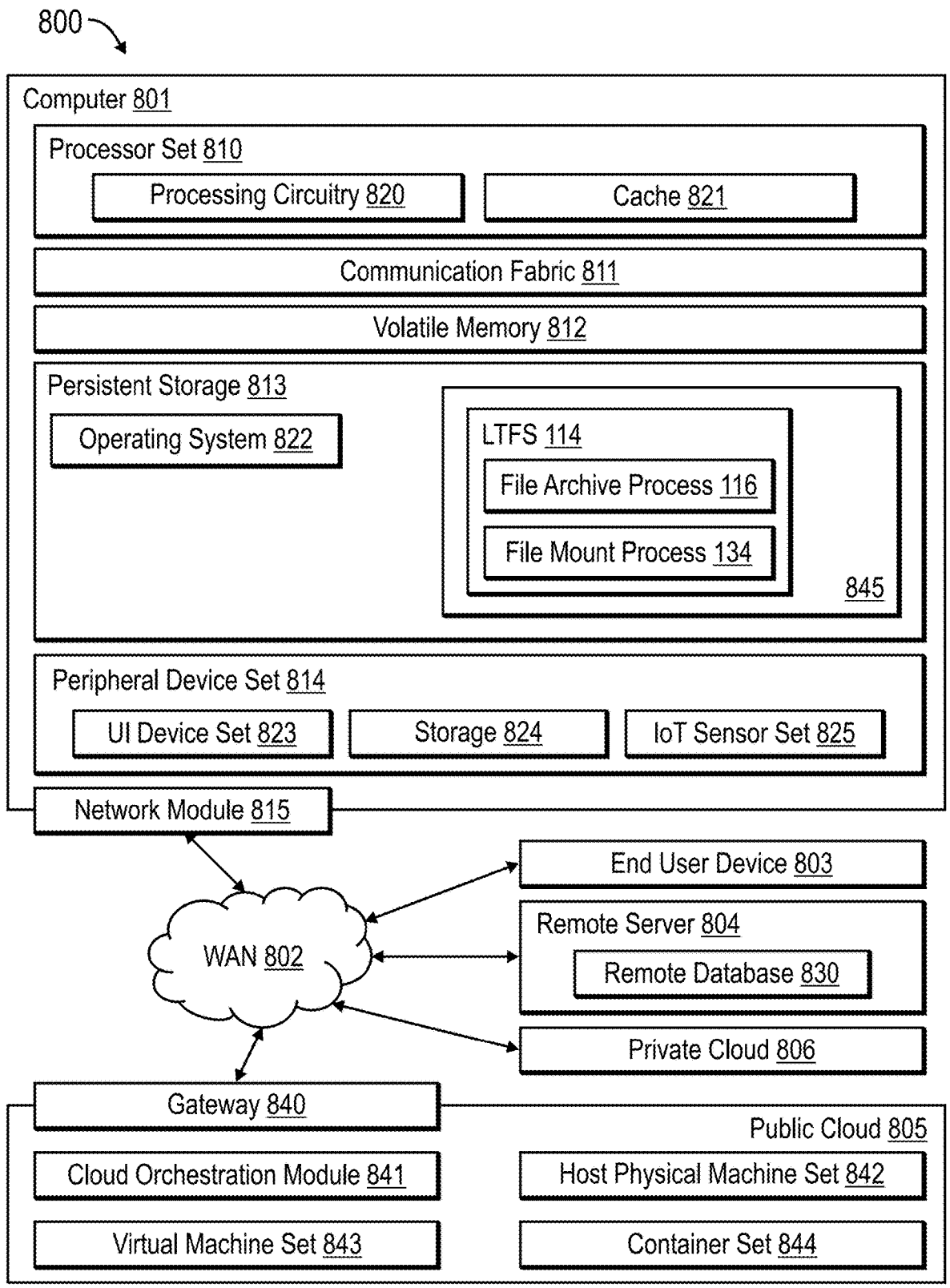
FIG. 8 a computing environment in which the components of FIG. 1 may be implemented.

With respect to FIG. 8, computing environment 800 contains an example of an environment for the execution of at least some of the computer code involved in performing the inventive methods, such as the LTFS program 114, including the file archive process 116 and file mount process 134 within block 845. In addition to block 845, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 845, as identified above), peripheral device set 814 (including user interface (UI) device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 8. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip."

In some computing environments, processor set 810 may be designed for working with qubits and performing quantum computing.

Computer-readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 845 in persistent storage 813.

COMMUNICATION FABRIC 811 is the signal conduction path that allows the various components of computer 801 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, volatile memory 812 is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface-type operating systems that employ a kernel. The code included in block 845 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may include the storage device 106 and tape drive 102. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer-readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN 802 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

CLOUD COMPUTING SERVICES AND/OR MICROSERVICES (not separately shown in FIG. 8): private and public clouds 806 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The letter designators, such as i, among others, are used to designate an instance of an element, i.e., a given element, or a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer implemented method for generating metadata tags for files in a first storage device type to write to a second storage device type, comprising:
   determining metadata tags for files in the first storage device type to write to the second storage device type, wherein the first storage device type and the second storage device type comprise different types of storage media;
   updating a tag list with the metadata tags for the files;
   determining bit representations for the files, wherein a bit representation for a file identifies metadata tags for the file in the tag list;
   converting the bit representations for the files to numerical values in a first numbering system different from a second numbering system used for the bit representations;
   writing the files in the first storage device type to the second storage device type; and
   writing the tag list and the numerical values for the files to an index in the second storage device type for the files written to the second storage device type, wherein the numerical values are read from the index in the second storage device type and used to generate metadata tags for the files for a program to enable access to the files stored in the second storage device type through a file system interface.

2. The computer implemented method of claim 1, wherein the second numbering system is selected from the group consisting of a hexadecimal numbering system, an octal numbering system, a binary coded decimal numbering system, a real numbering system, and a decimal numbering system.

3. The computer implemented method of claim 1, wherein the second storage device type comprises a tape drive.

4. The computer implemented method of claim 1, wherein the second storage device type comprises a tape drive, further comprising:
   receiving a query including at least one metadata tag in the tag list when mounting a tape media in the tape drive;
   determining a bit representation identifying the at least one metadata tag of the query in the tag list;
   converting the bit representation to a query numerical value in the second numbering system;
   processing the query numerical value and the numerical values for the files to determine whether the files are assigned a metadata tag of the query; and
   generating an object for a file to include metadata for the file from the index in response to determining that the file is assigned one of the at least one metadata tag of the query.

5. The computer implemented method of claim 4, wherein the processing the query numerical value and the numerical values for the files comprises:
   for each file having a numerical value, performing a logical AND of the numerical value for the file and the query numerical value, wherein the file is determined to be assigned one of the at least one metadata tag of the query in response to a result of the logical AND not being equal to zero, and wherein the file is determined to not be assigned one of the at least one metadata tag of the query in response to the result of the logical AND being zero.

6. The computer implemented method of claim 1, further comprising:
   determining a numerical value for a selected file read from the second storage device type;
   converting the numerical value to a bit representation for the selected file;
   determining metadata tags for the selected file in the tag list identified by the bit representation for selected file; and
   returning the determined metadata tags for the selected file.

7. The computer implemented method of claim 1, wherein the determining metadata tags for a selected file comprises:
   determining that the first storage device type includes a script file providing heuristic rules; and
   applying the heuristic rules to the selected file to generate the metadata tags for the selected file in response to determining that the script file provides the heuristic rules.

8. The computer implemented method of claim 1, wherein the determining metadata tags for a selected file comprises:
   determining whether the first storage device type includes a script file indicating a natural language processor; and
   invoking the natural language processor indicated in the script file to generate the metadata tags for the selected file in response to determining that the script file indicates the natural language processor.

9. A system for generating metadata tags for files in a first storage device type to write to a second storage device type, comprising:
   a processor; and
   a computer readable storage medium including program instructions that when executed by the processor causes operations, the operations comprising:
      determining metadata tags for files in the first storage device type to write to the second storage device type;
      updating a tag list with the metadata tags for the files;
      determining bit representations for the files, wherein a bit representation for a file identifies metadata tags for the file in the tag list;
      converting the bit representations to the files to numerical values in a first numbering system different from a second numbering system used for the bit representations;

writing the files in the first storage device type to the second storage device type; and writing the tag list and the numerical values for the files to an index in the second storage device type for the files written to the second storage device type, wherein the numerical values are read from the index in the second storage device type and used to generate metadata tags for the files for a program to enable access to the files stored in the second storage device type through a file system interface.

10. The system of claim 9, wherein the second storage device type comprises a tape drive, wherein the operations further comprise:

receiving a query including at least one metadata tag in the tag list when mounting a tape media in the tape drive;

determining a bit representation identifying the at least one metadata tag of the query in the tag list;

converting the bit representation to a query numerical value in the second numbering system;

processing the query numerical value and the numerical values for the files to determine whether the files are assigned a metadata tag of the query; and generating an object for a file to include metadata for the file from the index in response to determining that the file is assigned one of the at least one metadata tag of the query.

11. The system of claim 10, wherein the processing the query numerical value and the numerical values for the files comprises:

for each file having a numerical value, performing a logical AND of the numerical value for the file and the query numerical value, wherein the file is determined to be assigned one of the at least one metadata tag of the query in response to a result of the logical AND not being equal to zero, and wherein the file is determined to not be assigned one of the at least one metadata tag of the query in response to the result of the logical AND being zero.

12. The system of claim 9, wherein the operations further comprise:

determining a numerical value for a selected file read from the second storage device type;

converting the numerical value to a bit representation for the selected file;

determining metadata tags for the selected file in the tag list identified by the bit representation for selected file; and returning the determined metadata tags for the selected file.

13. The system of claim 9, wherein the determining metadata tags for a selected file in the first storage device type comprises:

determining that the first storage device type includes a script file providing heuristic rules; and applying the heuristic rules to the selected file to generate the metadata tags for the selected file in response to determining that the script file provides the heuristic rules.

14. The system of claim 9, wherein the determining metadata tags for a selected file comprises:

determining whether the first storage device type includes a script file indicating a natural language processor; and invoking the natural language processor indicated in the script file to generate the metadata tags for the selected file in response to determining that the script file indicates the natural language processor.

15. A computer program product for generating metadata tags for files in a first storage device type to write to a second storage device type, comprising a computer readable storage medium including program instructions that when executed by a processor perform operations, the operations comprising:

determining metadata tags for files in the first storage device type to write to the second storage device type, wherein the first storage device type and the second storage device type comprise different types of storage media;

updating a tag list with the metadata tags for the files;

determining bit representations for the files, wherein a bit representation for a file identifies metadata tags for the file in the tag list;

converting the bit representations to the files to numerical values in a first numbering system different from a second numbering system used for the bit representations;

writing the files in the first storage device type to the second storage device type; and writing the tag list and the numerical values for the files to an index in the second storage device type for the files written to the second storage device type, wherein the numerical values are read from the index in the second storage device type and used to generate metadata tags for the files for a program to enable access to the files stored in the second storage device type through a file system interface.

16. The computer program product of claim 15, wherein the second storage device type comprises a tape drive, wherein the operations further comprise:

receiving a query including at least one metadata tag in the tag list when mounting a tape media in the tape drive;

determining a bit representation identifying the at least one metadata tag of the query in the tag list;

converting the bit representation to a query numerical value in the second numbering system;

processing the query numerical value and the numerical values for the files to determine whether the files are assigned a metadata tag of the query; and generating an object for a file to include metadata for the file from the index in response to determining that the file is assigned one of the at least one metadata tag of the query.

17. The computer program product of claim 16, wherein the processing the query numerical value and the numerical values for the files comprises:

for each file having a numerical value, performing a logical AND of the numerical value for the file and the query numerical value, wherein the file is determined to be assigned one of the at least one metadata tag of the query in response to a result of the logical AND not being equal to zero, and wherein the file is determined to not be assigned one of the at least one metadata tag of the query in response to the result of the logical AND being zero.

18. The computer program product of claim 15, wherein the operations further comprise:

determining a numerical value for a selected file read from the second storage device type;

converting the numerical value to a bit representation for the selected file;

determining metadata tags for the selected file in the tag list identified by the bit representation for selected file; and returning the determined metadata tags for the selected file.

19. The computer program product of claim 15, wherein the determining metadata tags for a selected file comprises:
   determining that the first storage device type includes a script file providing heuristic rules; and
   applying the heuristic rules to the selected file to generate the metadata tags for the selected file in response to determining that script file provides the heuristic rules.

20. The computer program product of claim 15, wherein the determining metadata tags for a selected file comprises:
   determining whether the first storage device type includes a script file indicating a natural language processor; and
   invoking the natural language processor indicated in the script file to generate the metadata tags for the selected file in response to determining that the script file indicates the natural language processor.

* * * * *